(12) United States Patent
Konagaya

(10) Patent No.: US 7,280,236 B2
(45) Date of Patent: Oct. 9, 2007

(54) AUTOMATED PRINTING SYSTEM INCLUDING ORDER INPUTTING APPARATUS AND IMAGE INPUTTING DEVICE

(75) Inventor: Tatsuya Konagaya, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 390 days.

(21) Appl. No.: 10/986,823

(22) Filed: Nov. 15, 2004

(65) Prior Publication Data

US 2005/0108042 A1    May 19, 2005

(30) Foreign Application Priority Data

Nov. 14, 2003    (JP) .............................. 2003-385577

(51) Int. Cl.
*G06F 15/00* (2006.01)
*G06F 3/12* (2006.01)

(52) U.S. Cl. ..................................... 358/1.12; 358/1.18
(58) Field of Classification Search ................. 358/1.1, 358/1.9, 1.13, 1.15, 1.18, 302, 402, 474; 705/1
See application file for complete search history.

(56) References Cited

U.S. PATENT DOCUMENTS

| 5,113,351 A | | 5/1992 | Bostic et al. |
| 5,799,219 A | * | 8/1998 | Moghadam et al. ........ 396/319 |
| 6,100,992 A | * | 8/2000 | Yoshiura et al. ........... 358/1.14 |

FOREIGN PATENT DOCUMENTS

| JP | 4-506273 A | 10/1992 |
| JP | 2000-347301 A | 12/2000 |

* cited by examiner

*Primary Examiner*—Gabriel I. Garcia
(74) *Attorney, Agent, or Firm*—Sughrue Mion PLlc.

(57) ABSTRACT

A printing system includes an order inputting apparatus for inputting image data of an image to be printed and a printing number of printing of the image according to a customer order. A printer for use with photographic paper prints the image according to the image data from the order inputting apparatus. A print container contains a photographic print produced by the printer. The order inputting apparatus and the print container are installed in a customer region. The printer is installed in a printing region different from the customer region. Specifically, a partition panel keeps distinct the customer region and the printing region from one another. The print container is positioned opposite to the printer with respect to the partition panel.

8 Claims, 8 Drawing Sheets

AUTOMATED PRINTING SYSTEM INCLUDING ORDER INPUTTING APPARATUS AND IMAGE INPUTTING DEVICE

BACKGROUND OF THE INVENTION

1. Field of the Invention

The present invention relates to a printing system. More particularly, the present invention relates to a printing system in which placing a customer order is well automated, and a region for printing is so separate from a region for customers that they can wait in a safe and comfort environment for finish of prints.

2. Description Related to the Prior Art

A commercial printing system for producing prints from photographic paper is known as printing service. Images on a developed photographic film are printed on the photographic paper. Also, electronic image data are read from a memory card or other storage medium, to print images on the photographic paper. In general, an attendant or photo finisher of a photofinishing shop accepts a customer order placed by a customer. The customer is informed by the attendant of estimated time required for finishing the prints. When or after the estimated time has elapsed, he or she visits the photofinishing shop again to receive supply of the prints by payment for the service. There are various problems, one of which lies in requirement of a sufficient number of attendants. Another problem lines in difficulties in managing numerous orders without errors.

JP-A 2000-347301 discloses a self-service type of the printing system. The customer at the printing system sets a storage medium in a card reader or other data reader, and operates an inputting panel to input information, such as designated images to be printed, and a setting of the printing number of prints to be produced. According to the input information, production of prints is effected automatically. The prints are obtained, stacked, and inserted into containing cells in a sorted manner per the customer order. When the customer comes to receive the prints, a discerning device for verifies ID of the customer, so as to allow access to the prints by unlocking one of the containing cells.

The customer is obliged to visit the photofinishing shop two times, one for placing the customer order, and the other for receiving products. This is inconsistent to easy availability of photographic prints for the customer, because of as short time for the printing as several minutes or tens of minutes. It is conceivable to set a customer waiting space inside the photofinishing shop, and to serve beverage, food or the like to the customer for the purpose of comfortably spending time for waiting. However, handling of beverage, food of the like in the photofinishing shop is legally not allowed for hygienic reasons. As the photofinishing shop inevitably uses harmful substances for photographic processes, commercial ideas for hospitality cannot be developed.

The printing system according to the prior document has another problem in that finished prints are dropped by gravity into containing cells. Damages are likely to occur on prints upon the drop, such as scratches, folds, and the like.

SUMMARY OF THE INVENTION

In view of the foregoing problems, an object of the present invention is to provide a printing system in which placing a customer order is well automated, and a region for printing is so separate from a region for customers that they can wait in a safe and comfort environment for finish of prints.

In order to achieve the above and other objects and advantages of this invention, a printing system is provided, where the printing system is disposed in regions including first and second regions. There is an order inputting apparatus, installed in the first region, for inputting image data of an image to be printed and a printing number of printing of the image according to a customer order. A printer is installed in the second region, for printing the image according to the image data from the order inputting apparatus. A print container is installed in the first region, for containing a printed matter produced by the printer.

Furthermore, a partition panel keeps distinct the first and second regions from one another. The print container is positioned opposite to the printer with respect to the partition panel.

The print container includes plural containing cells for being loaded with the printed matter per the customer order.

Furthermore, a sorter transports the printed matter from the printer into the containing cells in a form sorted per the customer order.

Each of the containing cells includes a rear path, formed to open toward an inside of the second region through the partition panel, for being supplied with a stack of the printed matter by the printer. A front door is positioned to face an inside of the first region, for being opened to remove the stack of the printed matter.

Furthermore, a lock mechanism blocks removal of the printed matter by locking the containing cells being closed. The order inputting apparatus produces and stores reference information of the customer order upon placing of the customer order. A verification device checks whether receiving reference information input for receipt related to the customer order is associated with the reference information, and if association of the receiving reference information is verified, shifts the lock mechanism to unlock a corresponding one of the containing cells, to allow the removal of the printed matter.

The sorter includes a stacking carriage, disposed behind the containing cells, for stacking the printed matter per the customer order. A transfer unit specifies an associated one of the containing cells associated with the customer order, positions the stacking carriage, and moves the stack of the printed matter toward a position of the specified containing cell.

The print container includes an externally operable verification inputting device for inputting reference information of the customer order. A checkout display panel displays information of an amount billed of the customer order according to the reference information. There is a checkout device for checkout of the amount billed of the customer order. After the checkout of the amount billed, the verification device shifts the lock mechanism for unlocking.

The order inputting apparatus includes an image inputting device for inputting the image data of the image. An order inputting panel inputs information of the customer order for printing of the image. An ordering display panel displays the information of the customer order to check the customer order. An order registering device outputs the reference information of the customer order by registering the customer order.

The image inputting device includes at least one of a scanner and a data reader. The order registering device is constituted by a reference sheet printer for printing the reference information.

The containing cells are arranged in a vertical direction and a horizontal direction two-dimensionally. The transfer unit includes a moving mechanism for moving the stacking carriage in the vertical direction and the horizontal direction two-dimensionally. A shifting mechanism advances the stack of the printed matter when the stacking carriage is positioned behind the specified containing cell.

The containing cells are arranged in a vertical direction and a horizontal direction two-dimensionally. The transfer unit includes plural transfer chutes, having respectively an upper end opening and a lower end opening, the upper end opening being disposed under the stacking carriage, and arranged in a front-to-back direction and the horizontal direction two-dimensionally, the lower end opening being connected with a rear path of respectively the containing cells. A moving mechanism moves the stacking carriage in the front-to-back direction and the horizontal direction two-dimensionally. A shifting mechanism is actuated when the stacking carriage is positioned directly above one of the transfer chutes which extends toward the specified containing cell, for shifting the stack of the printed matter into the upper end opening in association therewith.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
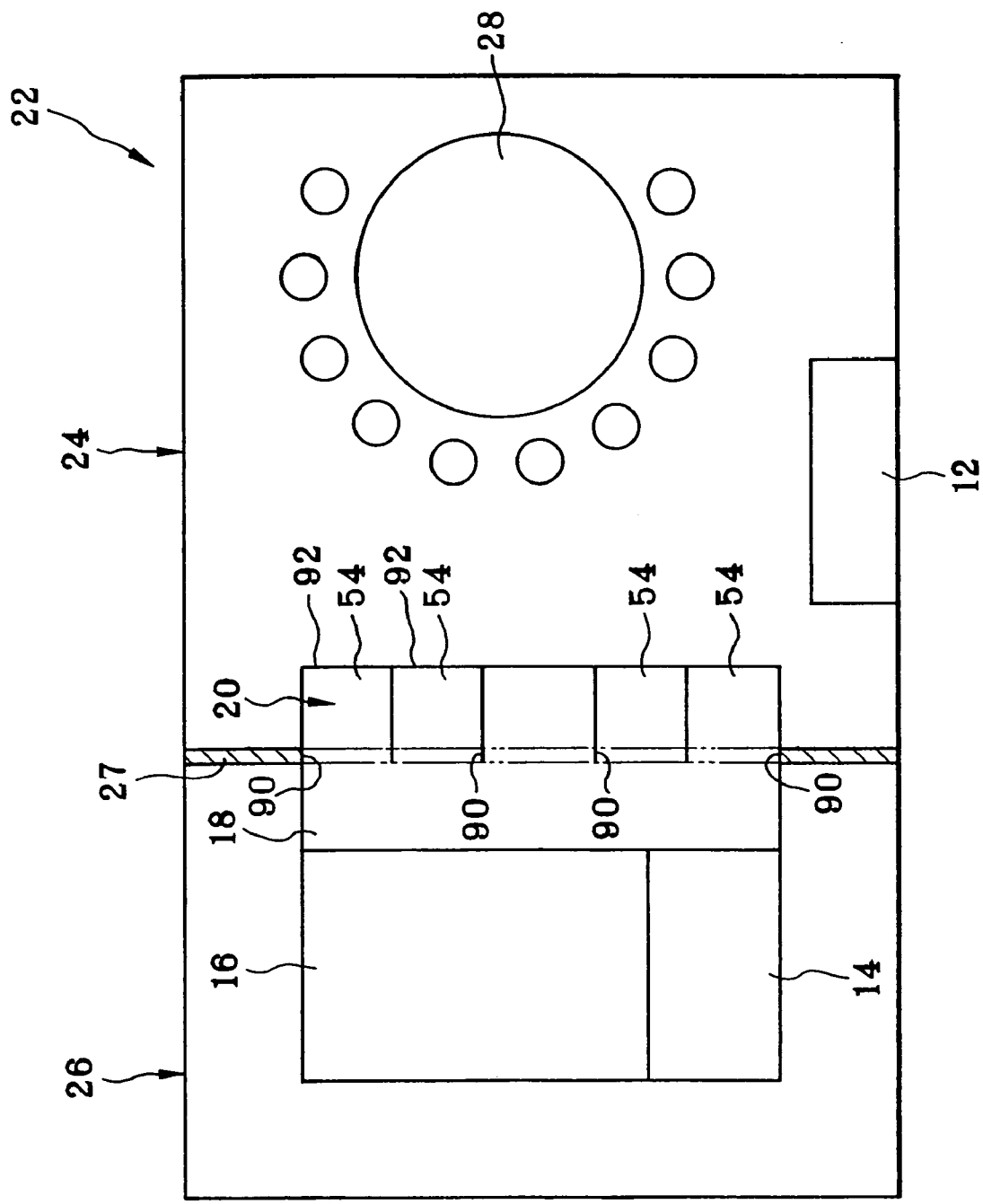
FIG. 1 is a plan illustrating arrangement of chambers in a photofinishing shop.
Figure 2:
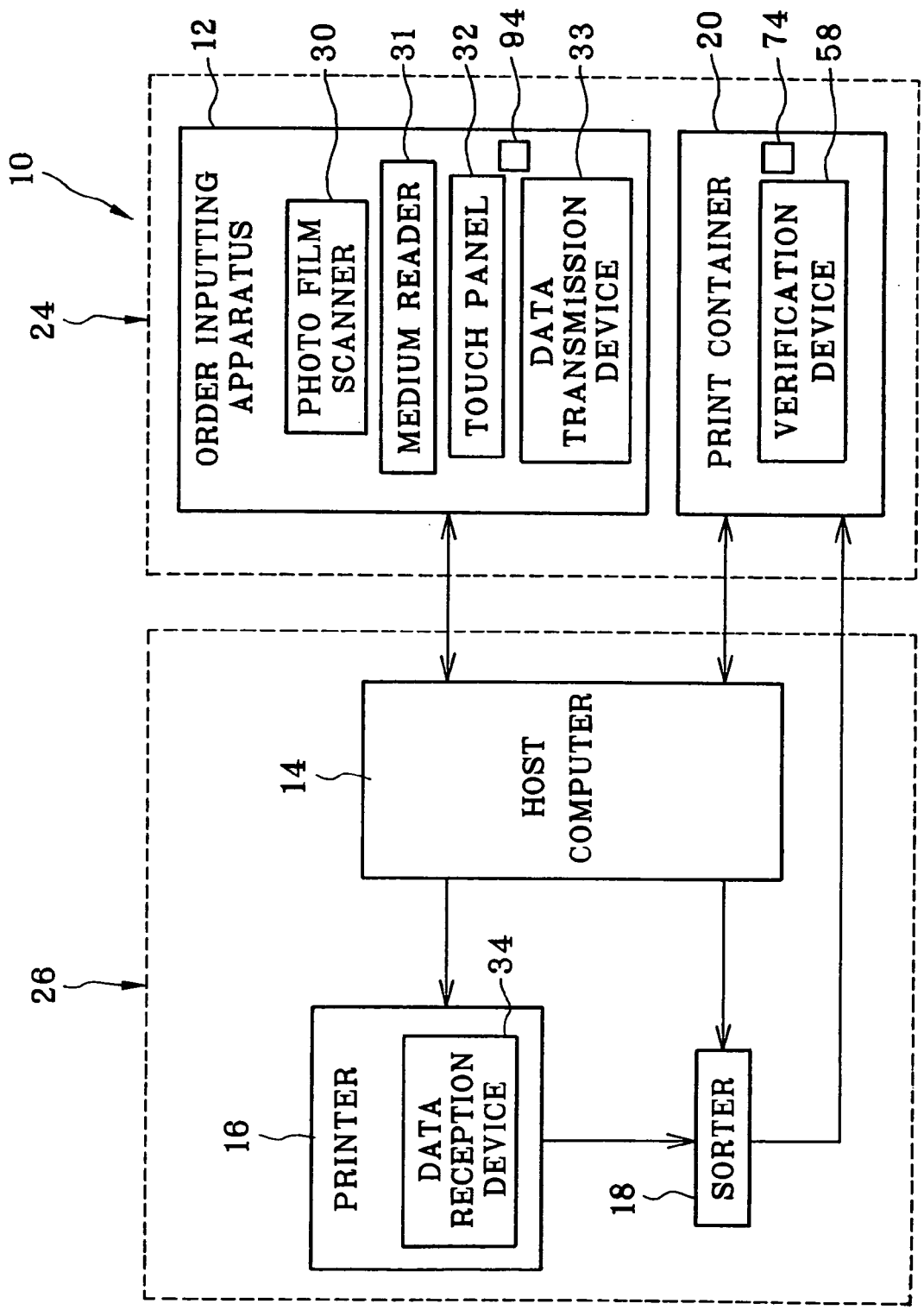
FIG. 2 is a block diagram schematically illustrating a printing system.

In FIGS. 1 and 2, a printing system 10 of the invention is illustrated. The printing system 10 includes an order inputting apparatus 12, a host computer 14, a printer 16, a sorter 18, and a print container 20 of a locker type. A room of a photofinishing shop 22 includes a customer region 24 as first region and a printing region 26 as second region, which are partitioned by a partition panel 27. Customers are allowed to enter only the customer region 24 for the purpose of placing orders and receiving products, and are not allowed to enter the printing region 26. In the customer region 24 are installed the order inputting apparatus 12 and the print container 20. Also, a customer waiting space 28 is included in the customer region 24 for customers to sit at a table while they are waiting for the finish of the printing. It is possible for attendants of the photofinishing shop 22 to serve beverage, food or the like to customers. In the printing region 26 are installed the host computer 14, the printer 16, and the sorter 18. The host computer 14 controls the printing system 10 in an entire manner.

In FIG. 2, the order inputting apparatus 12 is connected with the host computer 14 by use of a communication system on line or wirelessly. The order inputting apparatus 12 includes a photo film scanner 30 as image inputting device, a medium reader 31 as image inputting device, a touch panel 32 as order inputting panel and also ordering display panel, and a data transmission device 33. The photo film scanner 30 reads images or frames by scanning the developed negative photo film. The medium reader 31 reads image data from a storage medium. The images as read photoelectrically or electronically are indicated on the touch panel 32 one after another.

A customer views the touch panel 32, designates images or frames that he or she wishes for printing, and inputs printing numbers of the images. It is possible for the customer to enter a correction signal for correcting density of the designated frames or the like by touching the touch panel 32. The data transmission device 33 transmits communication signals of the image data and the information of the printing numbers. A data reception device 34 of the printer 16 receives the communication signals transmitted by the data transmission device 33 in cooperation with the host computer 14.

Figure 3:
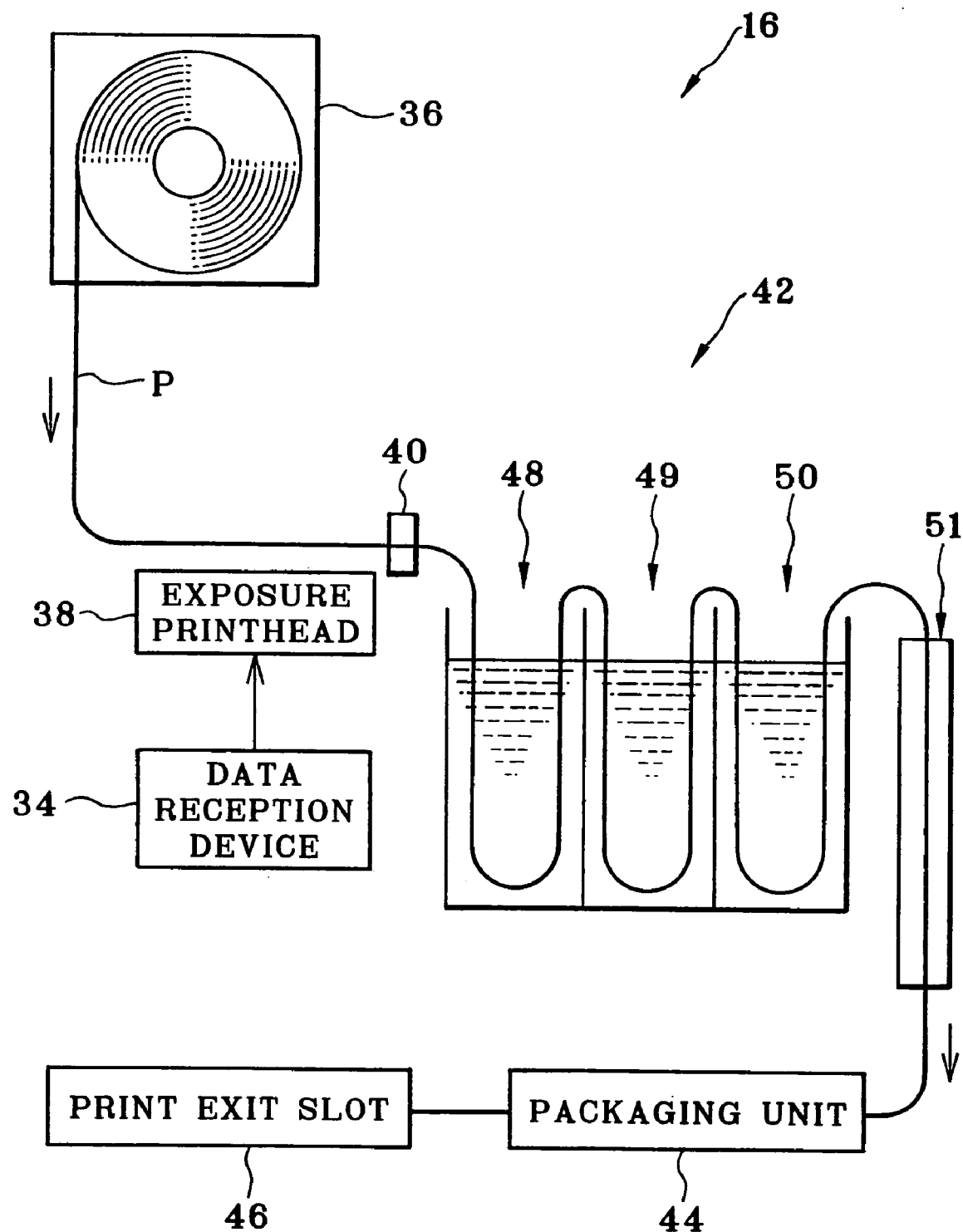
FIG. 3 is an explanatory view illustrating internal elements in a printer.

In FIG. 3, the printer 16 includes the data reception device 34 and also a photographic paper container 36, an exposure printhead 38, a paper cutter 40, a processing bath group 42, a packaging unit 44, and a print exit slot 46. The photographic paper container 36 is loaded with a roll of photographic paper P of a great length. The photographic paper P unwound from the photographic paper container 36 is transported toward the exposure printhead 38. The exposure printhead 38 operates according to image data of images or frames to be printed after data reception in the data reception device 34, and prints images on the photographic paper P by exposure with printing light obtained by modulation of intensity for primary colors. The photographic paper P is cut by the paper cutter 40 into print sheets per image, before the print sheets are sent to the processing bath group 42.

The processing bath group 42 includes a color developing bath 48, a bleach/fixing bath 49, a rinsing bath 50 for water washing, and a drier 51 in a drying chamber. The photographic paper P is moved past the liquid baths, and subjected to photographic processing of a predetermined type. The prints after being developed are packaged by the packaging unit 44 for each of the customer orders, and are ejected through the print exit slot 46.

Figure 4:
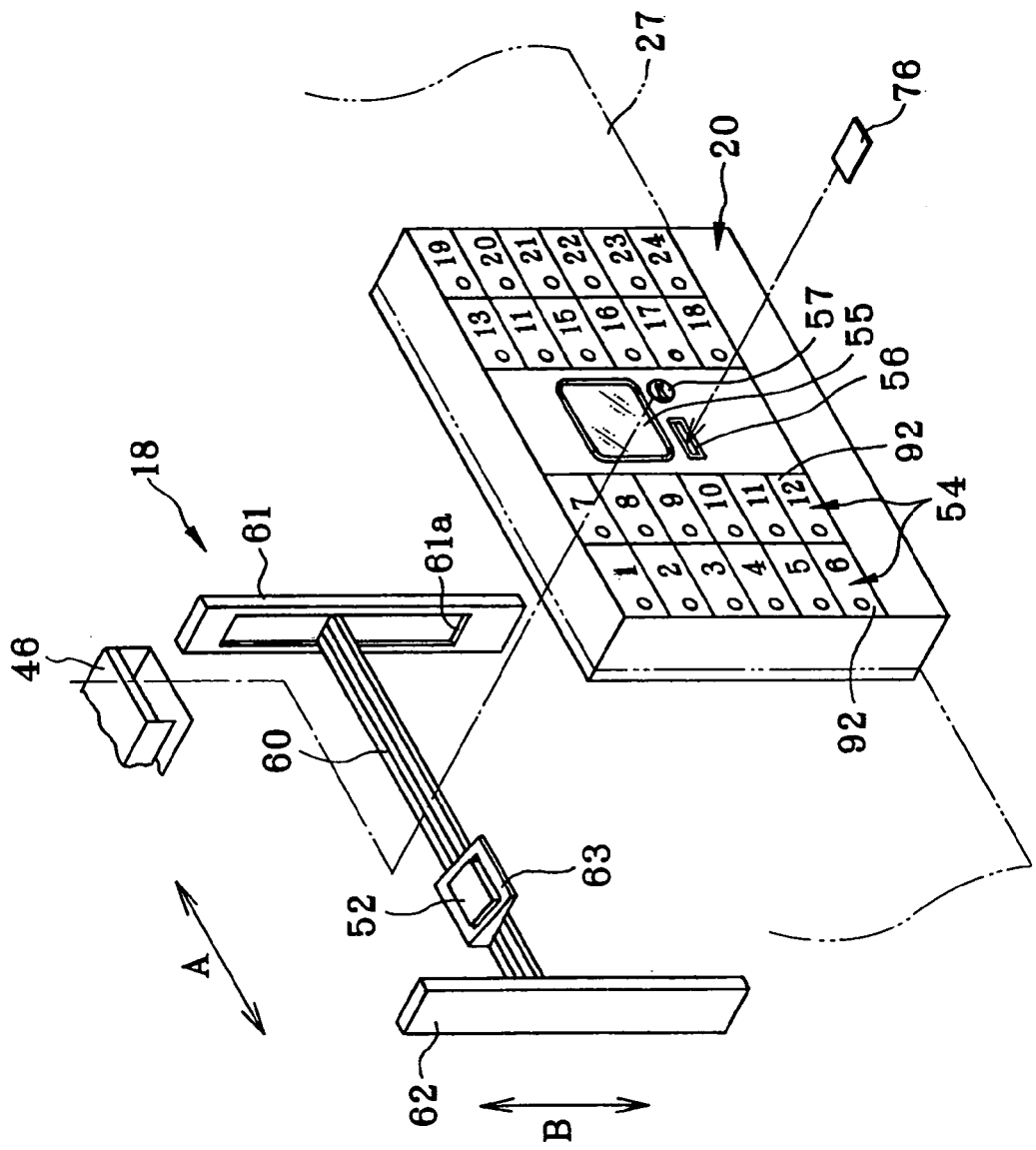
FIG. 4 is a perspective view illustrating a print container and a sorter.

Prints or printed matters, after ejection from the print exit slot 46, are sorted and stacked by the sorter 18, so print stacks 52 of the prints are obtained. Containing cells 54 in the print container 20 are loaded with the packaged print stacks 52 according to locations assigned to the print stacks 52. In FIG. 4, the sorter 18 and the print container 20 are illustrated in combination. A rear path 90 is formed through the print container 20 in each of the containing cells 54, communicates with an opening in the partition panel 27 and to the sorter 18. In the print container 20, the containing cells 54 are arranged in a matrix form, namely in six cells as viewed vertically and four cells as viewed horizontally. Also, the print container 20 includes a checkout liquid crystal display panel (LCD) 55, a verification inputting insertion port 56, and a checkout device 57 with a slot. A verification device 58 or controller is incorporated and disposed behind the checkout LCD 55. As will be described in detail, a customer reference sheet 76 for acknowledgment with reference information is inserted into the verification inputting insertion port 56, and scanned for reading a bar code so as to identify a customer. A lock mechanism 74 of a front door 92 of one of the containing cells 54 corresponding to the identified customer is released for access of prints for the customer. The checkout LCD 55 is caused to indicate a sequence of processes for the customer to receive the prints.

The sorter 18 is disposed close to the rear path 90 of the print container 20. The sorter 18 includes a transfer belt 60 as moving mechanism, stays 61 and 62, and a stacking carriage or case 63. The transfer belt 60 extends in the direction A of FIG. 4 in parallel with the rear face of the print container 20. The stays 61 and 62 support ends of the transfer belt 60. The stacking carriage 63 is fixedly secured on the transfer belt 60. Groove-formed vertical panels 61a for a vertical shifter constitute the stays 61 and 62 opposed to one another, have grooves, along which the transfer belt 60 is shifted in the vertical direction B. The transfer belt 60 is settable in a stopped state at a height associated with each horizontal line of the containing cells 54. The movement of the transfer belt 60 moves the stacking carriage 63 in the direction A horizontally. A surface of the stacking carriage 63 for placement of the print stack 52 has an inclination. A stopper (not shown) is provided on the tilted surface for preventing a drop of the print stack 52 while the stacking carriage 63 moves in any direction.

At first, the transfer belt 60 is positioned at the uppermost end of the groove-formed vertical panels 61a. The stacking carriage 63 lies directly under the print exit slot 46. The print stack 52 ejected from the print exit slot 46 is placed on the stacking carriage 63. In response to this, the host computer 14 causes the transfer belt 60 to travel in the direction B at a predetermined amount, and stops the same at a height associated with a designated one of the containing cells 54. Then the transfer belt 60 is driven, to move the stacking carriage 63 in the direction A, and stops the stacking carriage 63 at the rear path 90 of the designated one of the containing cells 54. Then a stopper of the stacking carriage 63 is unlatched, so as to cause the print stack 52 to slip down along the tilted board, and to contain the print stack 52 in the designated one of the containing cells 54. Those steps being completed, the stacking carriage 63 is moved again to the position directly under the print exit slot 46.

Figure 5:
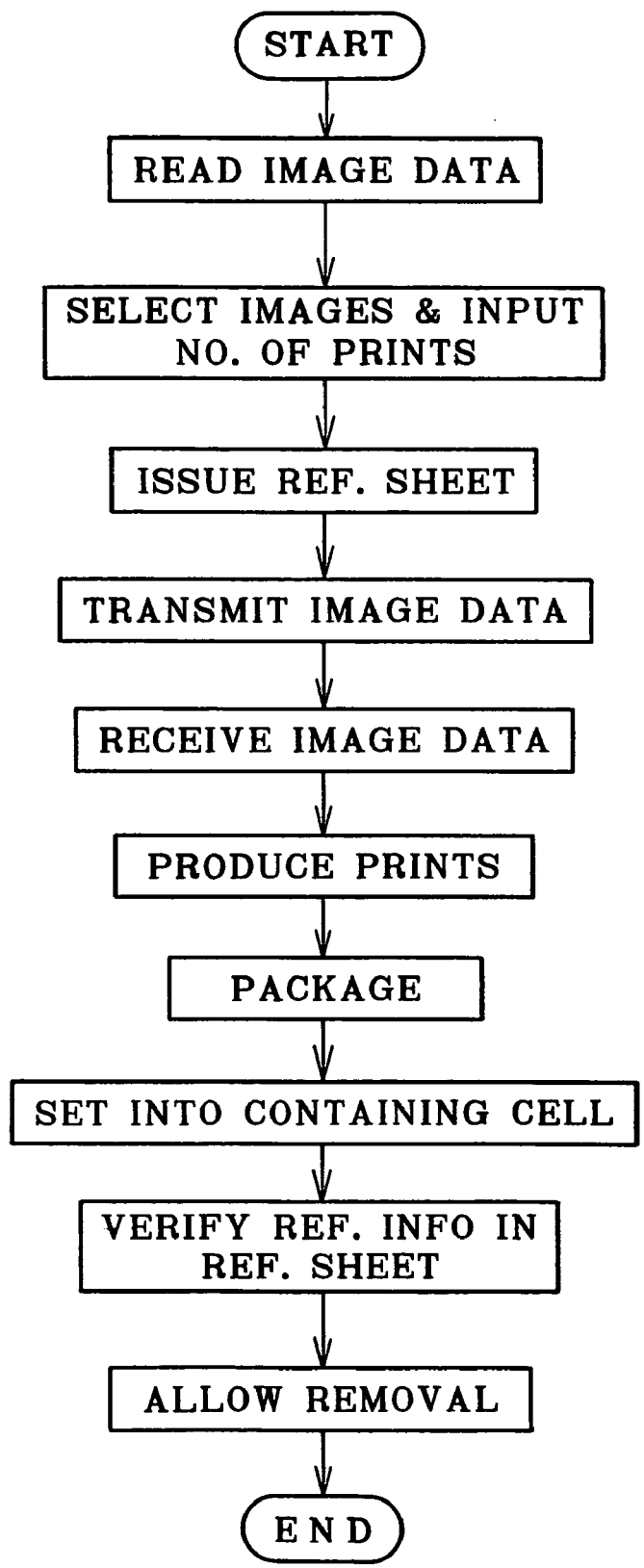
FIG. 5 is a flow chart illustrating a process of printing.
Figure 6:
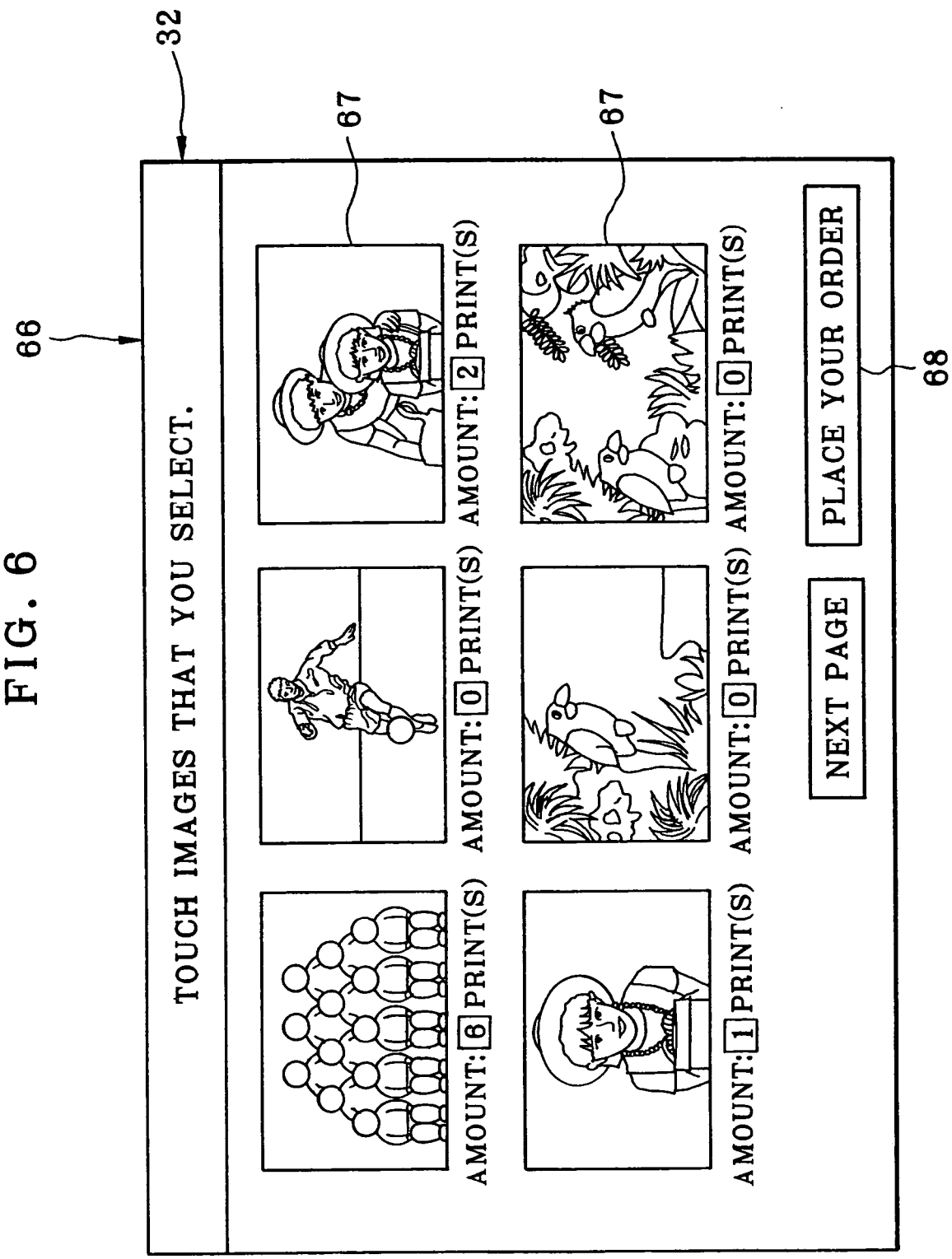
FIG. 6 is a diagram illustrating a designated image determining menu on a touch panel.

The operation of the printing system 10 is described by referring to FIG. 5. A customer loads the order inputting apparatus 12 with his or her developed negative photo film, or a storage medium in which image data have been recorded. The photo film scanner 30 or the medium reader 31 outputs the image data. A designated image determining menu or pattern 66 in the touch panel 32 is caused to display images 67 according to the image data. See FIG. 6. In the designated image determining menu 66, a printing number of zero (0) is indicated under each of the images 67 in an initial amount. Each time that one of the images 67 is touched in the touch panel 32, the relevant printing number is stepped up by one. The customer touches the images 67 for times of desired numbers. Then an order placing button 68 in the touch panel 32 is touched for turning on by the customer.

Figure 7:
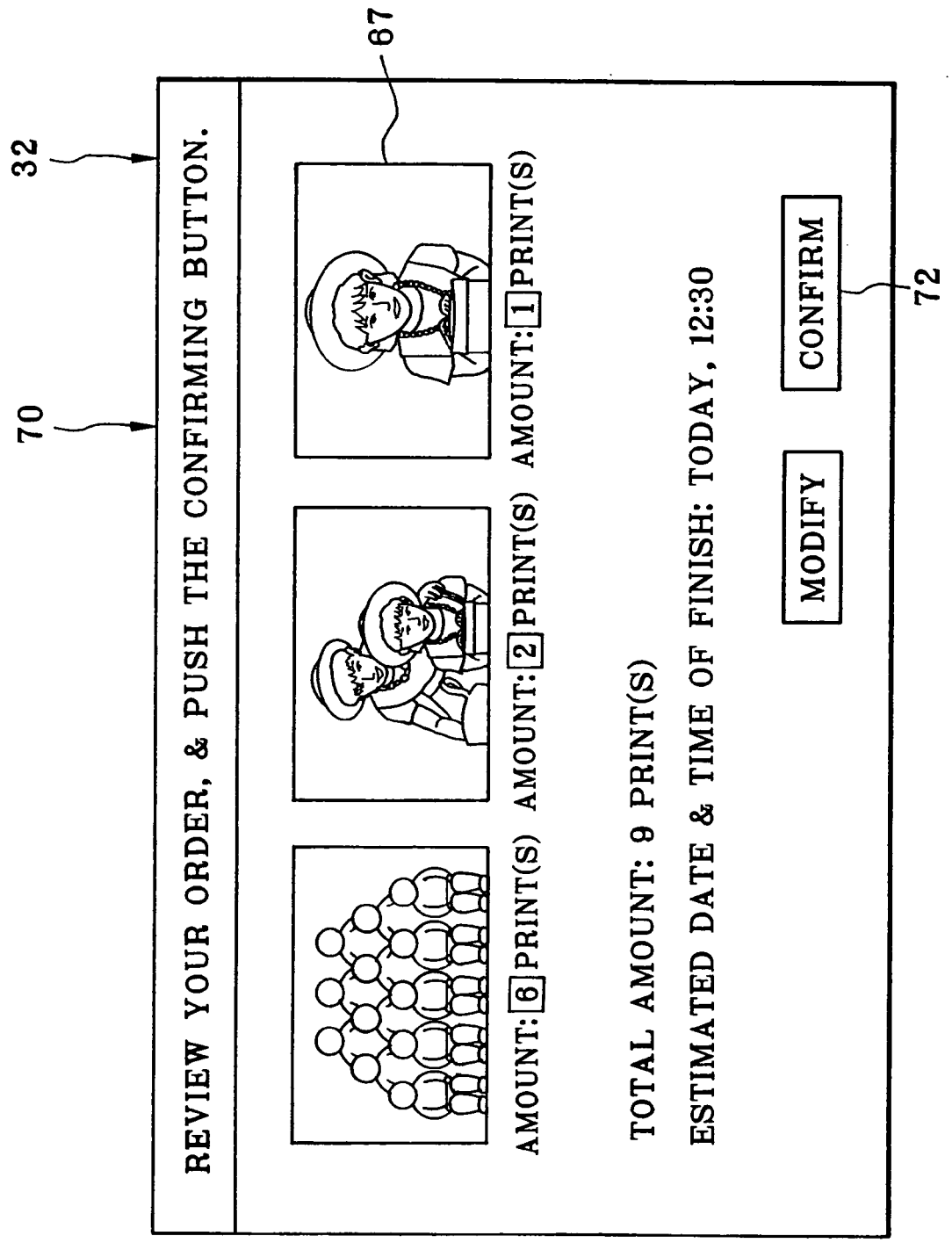
FIG. 7 is a diagram illustrating a confirming menu on the touch panel.

A confirming menu or pattern 70 appears in the touch panel 32 next as the touch panel 32 is driven by the controller. See FIG. 7. On the confirming menu 70, a number of items are displayed, including the images 67 to be printed, the printing numbers of prints of the images 67, the total number of the printing numbers, and the estimated time required until the finish of the prints. The estimated time is calculated by the host computer 14 according to the conditions of the use of the printer 16 and the printing numbers. The customer views and checks the reference information related to his or her customer order, and touches or clicks a confirming button 72 if the reference information are found correct without errors.

When the specifics of the customer order are confirmed, a reference sheet printer 94 as order registering device in the order inputting apparatus 12 prints and issues the customer reference sheet 76 of FIG. 4. The customer reference sheet 76 includes printed information including the total number of the printing numbers, the estimated time of the finish, and a reference bar code for identification of the customer. The estimated time is at least several minutes and at most tens of minutes in normal situations. A user can wait in the customer waiting space 28 after receiving the customer reference sheet 76. Customers in the customer waiting space 28 are served with food or beverage, and can spend time in a comfortable manner until the finish of the prints.

Upon receiving a signal of the customer order, the host computer 14 starts up the printer 16. Image data of the images 67 to be printed are transmitted by the data transmission device 33, and sent from the host computer 14 to the data reception device 34. The printer 16 produces prints of the images 67 according to the numbers designated by the customer, and packages the prints in the form of the print stacks 52 per customer order. The print stacks 52 are ejected through the print exit slot 46.

The print stack 52 ejected through the print exit slot 46 is placed on the stacking carriage 63 of the sorter 18. The stacking carriage 63 is moved to the rear path 90 of a selected one of the containing cells 54. Upon the stop of the stacking carriage 63, the stopper is released, to insert the print stack 52 into the selected one of the containing cells 54.

When the estimated time elapses, the customer is encouraged to come directly to the print container 20, views information displayed on the checkout LCD 55 of the print container 20, and inserts the customer reference sheet 76 into the verification inputting insertion port 56 by following the information. The verification device 58 in the print container 20 reads the bar code from the customer reference sheet 76, obtains reference information of the identity of the customer, and sends the reference information to the host computer 14.

The checkout LCD 55 is caused by the host computer 14 to display an amount billed of the prints for the customer. When he or she inserts coins of the amount billed into the slot of the checkout device 57, then the number of the selected one of the containing cells 54 is indicated in the checkout LCD 55 for the print stack 52. The lock mechanism 74 of the front door 92 of the selected one of the containing cells 54 is released, to allow the access of the user to the print stack 52. Thus, the print stack 52 is supplied.

Figure 8:
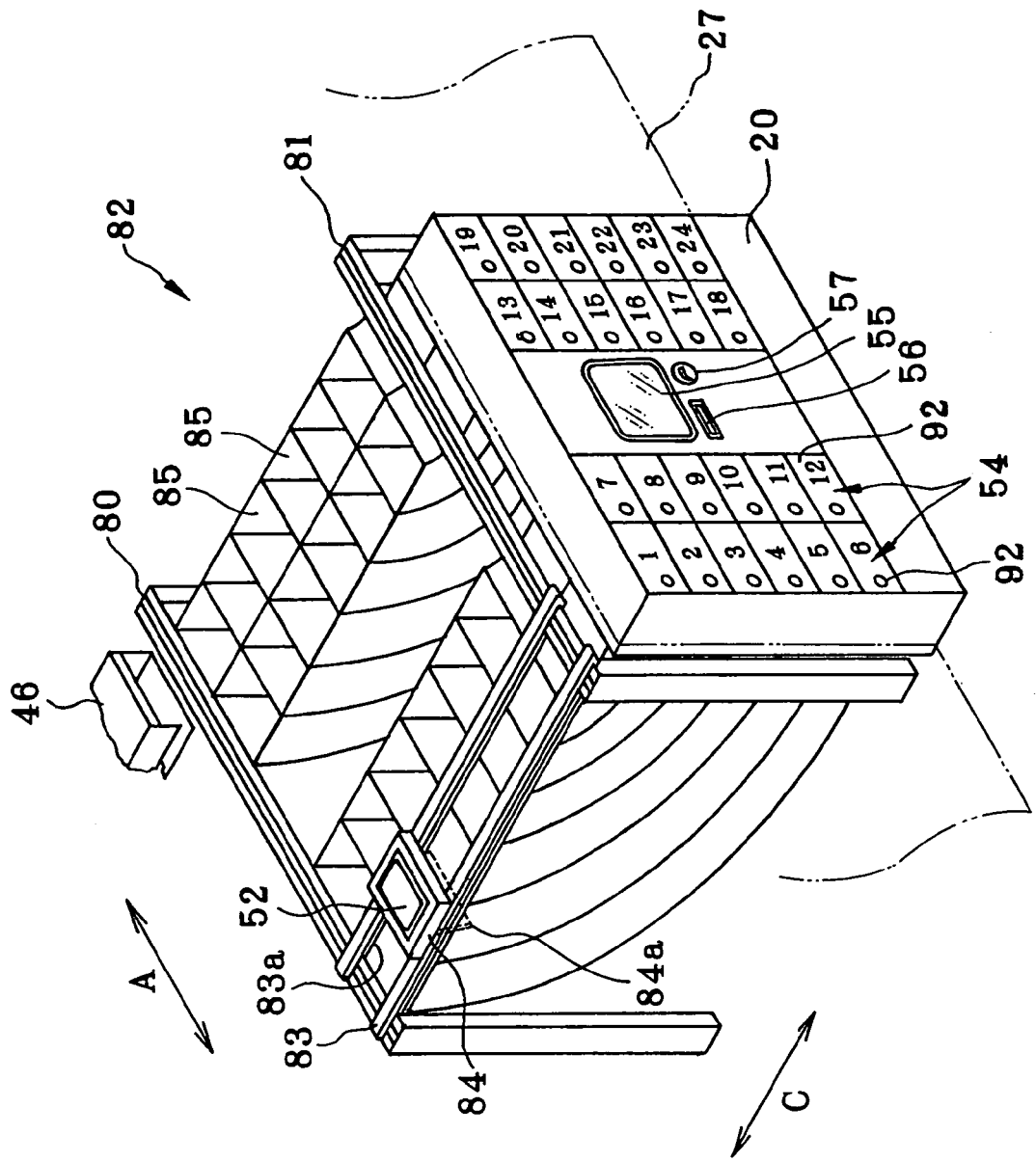
FIG. 8 is a perspective view illustrating another preferred sorter in combination with the print container.

In the above embodiment, the transfer belt 60 of the sorter 18 is movable up and down vertically in the direction B depicted in FIG. 4. Another preferred sorter 82 is illustrated in FIG. 8. Sorting guide rails 80 and 81 are disposed in the sorter 82 as stationary supports.

In FIG. 8, the sorter 82 is constituted by the sorting guide rails 80 and 81, transfer belts 83 as moving mechanism, a stacking carriage or case 84, and transfer chutes 85. The sorting guide rails 80 and 81 are disposed to extend in the direction A of FIG. 8 and in parallel with the orientation of the print container 20. The transfer belts 83 extend in the direction C of FIG. 8 and vertically to the sorting guide rails 80 and 81. The stacking carriage 84 is fixed on the transfer belts 83. The transfer chutes 85 are adjacent with one another between the sorting guide rails 80 and 81. The transfer belts 83 are movable in the direction A as supported on the sorting guide rails 80 and 81. Also, the transfer belts 83 can be circulated in the direction C for changing the position of the stacking carriage 84. Between the transfer belts 83, a belt middle space or upper end opening 83a is open in the upward direction. A lower lid 84a of the stacking carriage 84 for shifting the stack is openable and movable through the upper end opening 83a. The transfer chutes 85 are connected with respectively the containing cells 54. The number of the transfer chutes 85 is equal to that of the containing cells 54.

At first, the stacking carriage 84 is positioned lowest on the edge of the print exit slot 46. The print stack 52 from the print exit slot 46 is placed on the stacking carriage 84. Then the host computer 14 causes the transfer belts 83 to move in the direction A at a predetermined amount. Then the transfer belts 83 are circulated in the direction C, to stop the stacking carriage 84 at an upper end opening of a designated one of the transfer chutes 85. The lower lid 84a of the stacking carriage 84 is caused to open, to release the print stack 52 to advance into the designated one of the containing cells 54. Upon completing the advance of the print stack 52, the lower lid 84a is closed. The stacking carriage 84 comes again to the print exit slot 46.

In the printing system 10, the bar code in the customer reference sheet 76 is utilized for identifying the customer. However, other methods can be used for identifying a customer. For example, a customer can be provided with a member card issued upon placing one order for the first time. The member card can have a memory of a magnetic recording layer, which can store information of an ID number for the purpose of identifying the customer. It is possible for the customer to use the member card even upon placing second and further orders subsequently, and also to write information of the number of customer orders to the memory in the member card for each customer. In addition, a password can be determined by the order inputting apparatus 12 and assigned to each of the customers. At the time of receiving prints, the customer can input the password for establishing security of the customer. This is advantageous for an additional purpose. Even if a customer inadvertently has lost the customer reference sheet 76 or the member card, it is possible to supply the print stack 52 to the customer.

Note that the packaging unit 44 of the printer 16 in the printing system 10 may insert prints into containing cases or the like per each of the customer orders. The cases may be formed from paper or cardboard. But the packaging unit 44 can insert the prints into packaging bags. Furthermore, the order inputting apparatus 12 may be incorporated in the print container 20.

In the printing system 10, the number of the containing cells 54 is indicated for the purpose of receipt of the prints. However, it is possible to indicate the number of a selected one of the containing cells 54 at the time of placing an order. Furthermore, an indicating lamp or light source may be provided on each of the containing cells 54 for information of supply of prints. This makes it possible for the customer to receiving prints by the apparently distinct sign, without continuously watching the lapse of time by himself or herself.

Note that the front door 92 of the containing cells 54 is unlocked by shifting the lock mechanism 74. However, each of the containing cells 54 may have an automated door structure, which is automatically driven to open according to the location of the specified one of the print stacks 52.

The checkout device 57 may receive payment of coins, but may receive payment of bills or by a prepaid card. Furthermore, it is possible to use a credit card transaction device with which a customer can use his or her credit card for the purpose of subsequent payment by the card transaction.

In the above embodiment, the customer reference sheet 76 is printed and issued. However, only reference information of the customer reference sheet 76 can be indicated visibly or generated audibly as signals perceptible to a customer. He or she can record the reference information of the receipt of the order by handwriting the same.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A printing system disposed in regions including first and second regions, comprising:
   an order inputting apparatus, installed in said first region, for inputting image data of an image to be printed and a printing number of printing of said image according to a customer order;
   a printer, installed in said second region, for printing said image according to said image data from said order inputting apparatus;
   a print container, installed in said first region, for containing a printed matter produced by said printer;
   a partition panel for keeping distinct said first region and said second region from one another; and
   a sorter for transporting said printed matter into said containing cells selectively in a form sorted per said customer order,
   wherein said print container includes plural containing cells for being loaded with said printed matter per said customer order, and
   wherein each of said containing cells includes:
   a rear path, formed to open toward an inside of said second region through said partition panel, for guiding a stack of said printed matter from said printer to said first region; and
   a front door, positioned to face an inside of said first region, for being opened to allow removing said stack of said printed matter.

2. A printing system as defined in claim 1, further comprising:
   a lock mechanism for blocking removal of said printed matter by locking said front door;
   said order inputting apparatus produces and stores reference information of said customer order upon placing of said customer order;
   a verification device for checking whether receiving reference information input for receipt related to said customer order is associated with said reference information, and for, if association of said receiving reference information is verified, shifting said lock mechanism for unlocking, to allow said removal of said printed matter.

3. A printing system as defined in claim 2, wherein said sorter includes:
   a stacking carriage, disposed behind said containing cells, for stacking said printed matter per said customer order;

a transfer unit for specifying an associated one of said containing cells associated with said customer order to set said printed matter, for positioning said stacking carriage, and for moving said stack of said printed matter toward a position of said specified containing cell.

4. A printing system as defined in claim 3, wherein said containing cells are arranged in a vertical direction and a horizontal direction two-dimensionally;

said transfer unit includes:

a moving mechanism for moving said stacking carriage in said vertical direction and said horizontal direction two-dimensionally; and a shifting mechanism for advancing said stack of said printed matter when said stacking carriage is positioned in association with said specified containing cell.

5. A printing system as defined in claim 3, wherein said containing cells are arranged in a vertical direction and a horizontal direction two-dimensionally;

said transfer unit includes:

plural transfer chutes, having respectively an upper end opening and a lower end opening, said upper end opening being disposed under said stacking carriage, and arranged in a front-to-back direction and said horizontal direction two-dimensionally, said lower end opening being connected with a rear path of respectively said containing cells;

a moving mechanism for moving said stacking carriage in said front-to-back direction and said horizontal direction two-dimensionally; and a shifting mechanism, actuated when said stacking carriage is positioned directly above one of said transfer chutes which extends toward said specified containing cell, for shifting said stack of said printed matter into said upper end opening in association therewith.

6. A printing system as defined in claim 2, wherein said print container includes:

an externally operable verification inputting device for inputting reference information of said customer order;

a checkout display panel for displaying information of an amount billed of said customer order according to said reference information;

a checkout device for checkout of said amount billed of said customer order;

wherein after said checkout of said amount billed, said verification device shifts said lock mechanism for unlocking said front door.

7. A printing system as defined in claim 2, wherein said order inputting apparatus includes:

an image inputting device for inputting said image data of said image;

an order inputting panel for inputting information of said customer order;

an ordering display panel for displaying said information of said customer order to check said customer order; and an order registering device for registering said customer order.

8. A printing system as defined in claim 7, wherein said image inputting device includes at least one of a scanner and a data reader;

said order registering device is constituted by a reference sheet printer for printing said reference information.

* * * * *